UNITED STATES PATENT OFFICE 2,515,222

SULFURIZED CONDENSATE OF ALPHA-PINENE AND PHOSPHORUS PENTASULFIDE

William S. Hoock, Michigan City, and Milton P. Kleinholz, East Chicago, Ind., assignors to Sinclair Refining Company, New York, N. Y., a corporation of Maine No Drawing. Application July 18, 1947, Serial No. 761,994

2 Claims. (Cl. 260—139)

Our invention relates to a reaction product which is particularly valuable applied as a lubricating oil additive but which may be useful in other connections. Because of the oxidation-inhibiting action of the reaction product lubricating oils containing the same show improved resistance to deterioration and a reduced tendency to corrode bearings.

Our product is obtained by sulfurizing a condensate obtained by reacting a terpene with a phosphorus sulfide. As preferably prepared for use as a lubricating oil additive, the product represents a sulfurized condensate of alpha-pinene and phosphorus pentasulfide. The alpha-pinene need not be chemically pure. Thus, we have used with good effect the commercially available material identified in the trade as Pinene 111 which is said to contain about 92% alpha-pinene, 4–5% camphene and 3–4% dipentene and other terpenes.

Most suitably, the terpene before reaction with the phosphorus sulfide is pretreated for the removal of oxygen-containing impurities as by the process described in the co-pending application of Milton P. Kleinholz, Serial No. 674,932, filed June 6, 1946, Patent No. 2,453,712. In accordance with that process the terpene is refluxed for a substantial period over an alkali metal alcoholate, preferably a sodium alcoholate. The removal of the oxygen-containing impurities is advantageous in that the odor and thermal stability of our product is thereby improved.

Our product may be produced using various proportions of the reactants. However, where the product is to be employed in the preparation of a compounded lubricating oil, we recommend that from 3 to 8 mols of the terpene be employed for each mol of sulfide in the initial reaction and that the sulfurization of the terpene-phosphorus sulfide condensate be carried out using not less than one and one-half moles nor more than twenty-five moles of sulfur for each mole of sulfide employed in the condensation. These relative proportions are particularly applicable in the case of the preferred terpene and phosphorus sulfide, i. e. alpha-pinene and phosphorus pentasulfide. We do not know the exact mechanism by which the reactions giving our product proceed and we have made no attempt to determine either the molecular weight or structure of the product. As normally prepared the product is a solid at ordinary temperature. Applied as a lubricating oil additive it is best incorporated in the form of an oil solution having a phosphorus content of about 1.5 to 4%, for example, using as the solvent oil an oil whose viscosity and other characteristics are not such as to adversely affect the lubricating qualities of the oil to be inhibited. Ordinarily, we add the oil solution in such amounts as to give a blend having a phosphorus content of from .002% to 0.08%. Where, following addition of the oil solution, which may have the consistency of a viscous lubricating oil, a light precipitate develops on standing, as sometimes occurs, this may be avoided by the incorporation of about .05% on the weight of the inhibited oil of calcium mahogany sulfonate.

The following examples illustrating the preparation of the reaction product are not to be taken as in any way restrictive of the scope of our invention:

Example I

In a five liter, three-necked flask equipped with a mechanical stirrer and a thermometer was placed 1088 grams (8 moles) of alpha-pinene. An electric heating mantle was used to heat the alpha-pinene to 275° F. The heat was turned off and 444 grams (2 moles) of powdered phosphorus pentasulfide was added portionwise with vigorous stirring. The initial portions weighed approximately 40 grams and after about half of the phosphorus pentasulfide was added, the portions were increased to about 80 grams. Meanwhile the temperature was maintained between 270 and 280° F. by the rate of the phosphorus pentasulfide additions. After 1¾ hours, all the phosphorus pentasulfide had been added and the exothermic reaction was no longer apparent; the heater was turned on and the temperature was maintained at 275–280° F. for two hours. 96 grams (3 moles) or powdered sulfur was added in increments of 32 grams each at 45 minute intervals. After the second addition of sulfur the temperature was raised to 325–340° F. and so maintained for 5¾ hours after all the sulfur had been added. The heater was turned off and the product was diluted with 2302 grams of a Mid-Continent neutral lubricating oil. The product was filtered at a temperature of 200° F. using a commercial filter aid. Upon analysis it was found to contain 11.13% sulfur and 2.98% phosphorus. The acid number was 3.8 and the saponification number 59.

Example II

In a five liter, three necked flask equipped with a mechanical stirrer, a reflux condenser and a thermometer, was placed 1088 grams (8 moles) of alpha-pinene. An electric heating mantle was used to heat the alpha-pinene to 275° F. The heat was turned off and 444 grams (2 moles) of powdered phosphorus pentasulfide was added portionwise with vigorous stirring. The initial portions weighed approximately 40 grams and after about half of the phosphorus pentasulfide was added, the portions were increased to about 80 grams. Meanwhile the temperature was held at 275° F. by the rate of addition of the phosphorus pentasulfide. After 1½ hours all of the phosphorus pentasulfide had been added and the exothermic reaction was no longer evident. The heater was turned on and the reactants were maintained at 275° F. for 2 hours. 192 grams (6 moles) of powdered sulfur was added in toto and the temperature was increased to 325° F. At this time another exothermic reaction occurred and the temperature rose rapidly to 366° F. The flask was cooled to 325° F. and maintained at this temperature for 6 hours. The heat was turned off and the product was diluted with 2206 grams of a Mid-Continent neutral lubricating oil. The final product was filtered at 200° F. using a commercial filter aid. It contained 12.85% sulfur and 3.08% phosphorus. The acid and saponification numbers were 16.4 and 100 respectively.

Example III

In a five liter, three-necked flask equipped with a mechanical stirrer, a reflux condenser, and a thermometer, was placed 1088 grams (8 moles) of alpha-pinene. An electric heating mantle was used to heat the alpha-pinene to 275° F. The heat was turned off and 444 grams (2 moles) of powdered phosphorus pentasulfide was added portionwise with vigorous stirring. The first portions weighed approximately 40 grams and after about half of the phosphorus pentasulfide was added the portions were increased to about 80 grams. The addition of phosphorus pentasulfide required approximately 2 hours and the temperature was maintained at about 275° F. throughout this step. The reactants were kept at this temperature for an additional 2¼ hours and then 288 grams (9 moles) of powdered sulfur was added in three equal portions over a period of 45 minutes. After all sulfur had been added, the temperature was raised to 325° F. The temperature was maintained at about 325° F. for 6 hours after the final addition of sulfur was made and then the heater was turned off and 2110 grams of a Mid-Continent neutral lubricating oil was added. The final product was filtered with a commercial filter aid at a temperature of 200° F. It had an acid number of 25.4, a saponification number of 109 and contained 15.10% sulfur and 2.93% phosphorus.

Example IV

In a five liter, three-necked flask equipped with a stirrer, a reflux condenser, and a thermometer, was placed 1360 grams (10 moles) of alpha-pinene. An electric heating mantle was used to heat the alpha-pinene to 275° F. The heater was turned off and 444 grams (2 moles) of powdered phosphorus pentasulfide was added in increments of 40–80 grams each at such a rate as to maintain the temperature at about 275° F. The reactants were stirred vigorously during the phosphorus pentasulfide addition. The heater was turned on and the alpha-pinene phosphorus pentasulfide mixture was maintained at approximately 275° F. for an additional 2 hours. 192 grams (6 moles) of sulfur was added in three equal increments over a period of 45 minutes. After all the sulfur had been added, the temperature was raised to 325° F. and an exothermic reaction momentarily raised the temperature to 377° F. The flask was cooled to 325° F. and so maintained for 6 hours. The product was diluted with 1934 grams of a Mid-Continent neutral lubricating oil and, after cooling to 200° F., was filtered with a commercial filter aid. It had an acid number of 5.4 and a saponification number of 133 and contained 12.35% sulfur and 3.08% phosphorus.

Example V

In a five liter, three-necked flask equipped with a stirrer, a reflux condenser, and a thermometer, was placed 1360 grams (10 moles) of alpha-pinene. An electric heating mantle was used to heat the alpha-pinene to 275° F. The heater was turned off and 444 grams (2 moles) of powdered phosphorus pentasulfide was added in increments of 40–80 grams each at such a rate as to maintain the temperature at about 275° F. The alpha-pinene was stirred vigorously during the 1¾ hours while the phosphorus pentasulfide was introduced. The heater was turned on and the reactants were maintained at 275° F. for an additional 2 hours. 288 grams (9 moles) of sulfur was added in three equal portions over a period of 2 hours. The first portion of sulfur was added at a temperature of 275° F. and the heater was turned up until a temperature of 317° F. was reached. At this stage an exothermic reaction occurred and the heater was removed. The maximum temperature was 342° F. After addition of the balance of sulfur at about 317° F., the reaction was continued at 325° F. for 6 hours and the heater was turned off. The product was diluted with 1838 grams of a Mid-Continent neutral lubricating oil and filtered at 200° F. using a commercial filter aid. It analyzed 15.42% sulfur and 3.14% phosphorus. The acid number was 10.4 and the saponification number 109.

Example VI

In a five liter, three-necked flask equipped with a mechanical stirrer, a reflux condenser, and a thermometer was placed 1088 grams (8 moles) of alpha-pinene. An electric heating mantle was used to heat the alpha-pinene to 275° F. The heater was turned off and 222 grams (1 mole) of powdered phosphorus pentasulfide was added portionwise with stirring, at such a rate as to maintain the temperature at 275–285° F. during the 50 minutes required for the phosphorus pentasulfide addition. The heater was turned on and the temperature was kept at 275° F. for 1 hour. 384 grams (12 moles) of sulfur was added in three equal portions. Upon adding the first portion of sulfur the temperature was raised to 325° F. and an exothermic reaction occurred which momentarily raised the temperature to 350° F. After 1¾ hours, the second portion of sulfur was added and the temperature was kept at 300° F. for 1 hour. The third and final portion of sulfur was then added and the temperature was maintained at 325° F. for 6 additional hours. The heater was turned off, 1694 grams of a Mid-Continent neutral oil was added, and the product was filtered at 200° F. with a commercial filter aid. It analyzed 15.93% sulfur and 1.64% phosphorus. The acid number was 25.1 and the saponification number 108.

We claim:
1. The product obtained by sulfurizing with elemental sulfur at a reaction temperature within the approximate range 300° F.–340° F. a condensate prepared by reacting alpha pinene with phosphorus sulfide at a temperature of about 275°

F., where in the preparation of said condensate from about 3 to about 8 moles of the alpha pinene are used for each mole of phosphorus sulfide and where the sulfurization is effected using from about 1½ to about 25 moles of elemental sulfur for each mole of phosphorus sulfide employed in said condensation reaction.

2. The product of claim 1 wherein the phosphorus sulfide is phosphorus pentasulfide.

WILLIAM S. HOOCK.
MILTON P. KLEINHOLZ.

REFERENCES CITED

The following references are of record in the file of this patent:

UNITED STATES PATENTS

| Number | Name | Date |
|---|---|---|
| 1,963,084 | Gardner | June 19, 1934 |
| 2,242,260 | Prutton | May 20, 1941 |
| 2,356,073 | May | Aug. 15, 1944 |
| 2,413,648 | Ott | Dec. 31, 1946 |
| 2,415,837 | Musselman | Feb. 18, 1947 |